(12) United States Patent
Furumura

(10) Patent No.: US 8,154,456 B2
(45) Date of Patent: Apr. 10, 2012

(54) RF POWDER-CONTAINING BASE

(75) Inventor: Yuji Furumura, Yokohama (JP)

(73) Assignee: Philtech Inc., Tokyo (JP)

( * ) Notice: Subject to any disclaimer, the term of this patent is extended or adjusted under 35 U.S.C. 154(b) by 278 days.

(21) Appl. No.: 12/153,662

(22) Filed: May 22, 2008

(65) Prior Publication Data

US 2009/0289229 A1 Nov. 26, 2009

(51) Int. Cl.
*H01Q 1/38* (2006.01)
(52) U.S. Cl. .............................. 343/700 MS; 340/572.1
(58) Field of Classification Search ........... 252/700 MS; 340/572.1
See application file for complete search history.

(56) References Cited

U.S. PATENT DOCUMENTS

| | | | |
|---|---|---|---|
| 3,713,148 A | 1/1973 | Cardullo et al. | |
| 5,528,222 A | 6/1996 | Moskowitz et al. | |
| 5,581,257 A * | 12/1996 | Greene et al. | 342/51 |
| 6,517,900 B1 * | 2/2003 | Pierre | 427/209 |
| 7,508,305 B2 * | 3/2009 | Yamazaki et al. | 340/572.1 |
| 7,667,310 B2 * | 2/2010 | Dozen et al. | 257/678 |
| 7,683,838 B2 * | 3/2010 | Koyama et al. | 343/700 MS |
| 7,764,174 B2 * | 7/2010 | Rodgers | 340/572.1 |
| 7,799,147 B2 | 9/2010 | Matsukawa et al. | |
| 2008/0224937 A1 | 9/2008 | Kimura et al. | |
| 2008/0231445 A1 * | 9/2008 | Rodgers | 340/568.7 |
| 2010/0090925 A1 * | 4/2010 | Furumura et al. | 343/873 |

FOREIGN PATENT DOCUMENTS

| | | | |
|---|---|---|---|
| JP | 05-151428 A | 6/1993 | |
| JP | 10-171951 | 6/1998 | |
| JP | 2001-176899 A | 6/2001 | |
| JP | 2001-266097 A | 9/2001 | |
| JP | 2002-329684 A | 11/2002 | |
| JP | 2003-179005 A | 6/2003 | |
| JP | 2004-078991 A | 3/2004 | |
| JP | 2005-203751 A | 7/2005 | |
| JP | 2005-209104 A | 8/2005 | |
| JP | 2005-242629 A | 9/2005 | |
| JP | 2005-252242 A | 9/2005 | |
| JP | 2007128433 A | * | 5/2007 |
| JP | 2007128434 A | * | 5/2007 |
| JP | 2008134694 A | * | 6/2008 |

(Continued)

OTHER PUBLICATIONS

Dailey, Linda, Hitachi Researchers Develop Powder-Sized RFID Chips, IEEE Computer Society, May 2007, p. 23.*

(Continued)

*Primary Examiner* — Douglas W Owens
*Assistant Examiner* — Jennifer F Hu
(74) *Attorney, Agent, or Firm* — Maschoff Gilmore & Israelsen

(57) ABSTRACT

The present invention provides an RF powder-containing base including functional components, wherein forged cards, documents, bills, or the like are hard to be produced with respect to sheet-like subjects with high proprietary nature, such as various kinds of cards, bills, and securities, and each of a large number of particles can memorize information such as an identification number or the like. An RF powder-containing base 10 contains an RF powder (particles 11, 12, and 13), in which each particle of the RF powder provides an integrated circuit 15 formed on a substrate 14, an insulating layer 16 formed on the integrated circuit, and an antenna element 17 formed on the insulating layer, wherein each of the particles of the RF powder contained in the base has sensitivity to an electromagnetic waves having any of a plurality of different frequencies.

16 Claims, 5 Drawing Sheets

FOREIGN PATENT DOCUMENTS

| | | | | |
|---|---|---|---|---|
| JP | 2008134816 | A | * | 6/2008 |
| JP | 2008135446 | A | * | 6/2008 |
| JP | 2008135951 | A | * | 6/2008 |

OTHER PUBLICATIONS

Yoshiko, Hara, Hitachi advances paper-thin RFID chip, Feb. 6, 2006, EETimes News & Analysis.*
Usami, Mitsuo, An Ultra-Small RFID Chip: mu chip, 2004 IEEE Asia-Pacific Conference on Advanced Systeem Integrated Circuits(AP-ASIC2004)/Aug. 4-5, 2004 pp. 2-5.*
Mura et al., RF-Powder:Fabrication of 0.15 mm-Si-powder Resonating at Microwave Frequencies, Microwave Conference (Proceedings of the 37th European Microwave Conference), Oct. 2007, Munich, Germany, pp. 392-395.*
Miller, Paul, Mitachi's RFID powder freaks us the heck out, Feb. 14, 2007, http:/www.engadget.com/2007/02/14/hitachix-rfid-powder-freaks-us-the-heck-out.*
Nakamoto, Hiroyuki, A Passive UHF RF Identification CMOS Tag IC Using Ferroelectric RAM in 0.35-.*
Chen, Liu, Thermal Modeling for System-in-a-Package Based on Embedded Chip Structure, Oct. 2005, Polymers and Adhesives in Microelectronics and PHotonics, Pllytronic, 2005, 5th International Conference, pp. 224-227.*
Dailey, Linda, Hitachi Researchers Develop Poweder-Sized RFID chips, IEEE Computer Society, May 2007, p. 23.*
Hara, Yoshhiko, Hitachi Advances Paper-thin RFID, EE Times, Feb. 6, 2006.*
Usami, Mitsuo, An Ultra-Small RFID Chip: mu-Chip 2004 IEEE Asia-Pacific Conference on Advanced System Integrated Circuits (AP-ASIC2004)/Aug. 4-5, 2004.*
Usami, Mitsuo, Akira Sato, Hisao Tanabe, Toshiaki Iwamatsu, Shigeto Maegawa, Yuzuru Ohji, "An SOI-Based 7.5 um-Thick 0.15x0.15 mm sq RFID Chip," 2006 IEEE International Solid-State Circuits Conference, IEEE 2006.*
Usami, Mitsuo, "The μ-Chip, an Ultra-Small 2.45 GHz RFID Chip for Ubiquitous Recognition Applications," Applied Physics, 2004, p. 1179-1183, vol. 73, No. 9, Japan.
U.S. Appl. No. 12/153,661 Office Action mailed Sep. 24, 2010.
U.S. Appl. No. 12/153,661 Office Action mailed May 24, 2011.
Notice of Allowance mailed on Jan. 12, 2011 in related U.S. Appl. No. 12/153,661, Yuji Furumura, filed on May 22, 2008.
Notice of Allowance mailed on Oct. 17, 2011 in related U.S Appl. No. 12/153,661, Yuji Furumura, filed on May 22, 2008.
Kamal Sarabandi, "Compact Reconfigurable HF-UHF Antennas," Jun. 7, 2004, http://www.stormingmedia.us/61/6100/A610034.html.
Tetsuo Nozawa, "Hitachi Achieves 0.05-mm Square Super Micro RFID Tag, 'Further Size Reductions in Mind'," Tech-On Nikkei Business Publications, Feb. 20, 2007, http://techon.nikkeibp.co.jp/english/NEWS_EN/20070220/127959/.

* cited by examiner

RF POWDER-CONTAINING BASE

BACKGROUND OF THE INVENTION

1. Field of the Invention

The present invention relates to an RF powder-containing base and in particular, to an RF powder-containing base which can read information or the like via radio waves.

2. Description of Related Art

Currently, it is considered that integrated circuit (IC) tags are products indicating the beginning of the ubiquitous age. Labels, Suica cards, FeRAM cards, or the like have been developed previously as RF-ID (micro radio identification). Many people expect that an IC tag market will certainly grow larger in the future. However, the market has not grown enough to be expected. The reason is that there are also problems such as cost, security, and privacy other than technologies, which must be solved socially.

In addition, the RF-ID technology is considered to apply to identification of documents which have proprietary nature such as bills or securities. Forgery of bills and the like have been problems, and embedding the IC tags into the bills or the like can be devised as a method for solving those problems. However, the above-described method has not been achieved yet due to a high cost or a large size of the IC tags.

The cost of the IC tag can be reduced by reducing the size of the IC tag chip. It is because the number of IC tag chips obtained from a single wafer can be increased if the size of the IC tag chips is reduced. An IC tag chip of 0.4 millimeters square has been developed so far. This IC tag chip can read memory data of 128-bit via a 2.45 GHz microwave (refer to, for example, Non-patent Document 1).

Meanwhile, the RF-ID technology applicable to identification of bills, credit cards, or the like using components other than the IC tag is also devised. As an example thereof, a plurality of resonators which resonate to a plurality of radio frequencies are made to be contained in a substrate composed of paper or plastic in Patent Document 1. The resonator is a passive individual resonator, and resonates when a plurality of resonators are radiated by electromagnetic waves with radio frequency, and thus an arrangement of the plurality of resonators is grasped by detecting the resonance, allowing the substrate to be identified.

Patent Document 1: Japanese Unexamined Patent Publication (Kokai) No. 10-171951

Non-patent Document 1: "Micro radio IC tag chip "μ-chip"" by Mitsuo Usani in Applied Physics, Vol. 73, No. 9, 2004, p. 1179-p. 1183

SUMMARY OF THE INVENTION

Problem to be Solved by the Invention

When using the IC tags for conventional various kinds of cards, a single IC tag has been used for a single card. However, when using the IC tags for bills, for example, forged bills may be easily produced since the configuration is simple by only adding a single IC tag. In addition, when the resonators are made to be contained in the bills or the like as described in Patent Document 1, it is thought that forged bills are hard to be produced since identification is performed by an arrangement of a plurality of resonators and a difference in resonance frequency between the plurality of resonators. However, resonance frequency of the resonator can be changed, but the resonator itself cannot memorize information such as an identification number.

In view of the above-described problems, it is an object of the present invention to provide an RF powder-containing base including functional components, wherein forged cards, documents, bills, or the like are hard to be produced with respect to plate-like or sheet-like subjects with high proprietary nature, such as various kinds of cards, bills, and securities, and each of a large number of particles can memorize information such as an identification number or the like.

Means for Solving Problem

In order to achieve the above-described object, an RF powder-containing base according to the present invention is configured as follows.

A first RF powder-containing base (corresponding to claim 1) is characterized in that it contains an RF powder, and each particle of the RF powder is provided with an integrated circuit formed on a substrate, an insulating layer formed on the integrated circuit, and an antenna element formed on the insulating layer, wherein each of the particles of the RF powder contained in the base has sensitivity to an electromagnetic waves having any of a plurality of different frequencies.

A second RF powder-containing base (corresponding to claim 2) in the above-described configuration is characterized in that the base is preferably made of paper or plastic.

A third RF powder-containing base (corresponding to claim 3) in the above-described configuration is characterized in that the base is preferably a bill.

A fourth RF powder-containing base (corresponding to claim 4) in the above-described configuration is characterized in that a size of a rectangular plane including the longest side of the particle is preferably not less than 0.05 millimeters square and not more than 0.30 millimeters square.

A fifth RF powder-containing base (corresponding to claim 5) in the above-described configuration is characterized in that the size of the rectangular plane including the longest side of the particle is preferably 0.15 millimeters square.

According to the present invention, since the base which is made of paper or plastic contains a plurality kinds of RF powders having sensitivity to the electromagnetic waves with different frequencies, identification can be made not only by the arrangement of the plurality of RF powders and the electromagnetic waves with different frequencies of the RF powders but also by the information memorized in the integrated circuit, thus enabling the identification of the base to be ensured. As a result of this, when the base is applied to bills, such as paper, it is difficult to produce forged bills easily. Additionally, by arranging a plurality of RF powders in the base, combining arrangements, frequencies, and memorized information with each other makes it possible to provide a lot of information to the base.

EXPLANATIONS OF LETTERS OR NUMERALS

10: Base (bill)
11, 12, and 13: RF powder particle
14: Substrate
15; Integrated circuit (IC)
16; Insulating layer
17: Antenna element
18 and 19: Transistor
31: Computer
32: Reader/writer

DETAILED DESCRIPTION OF THE INVENTION

Hereinafter, preferred embodiments (examples) according to the present invention will be explained based on accompanying drawings.

Figure 1:
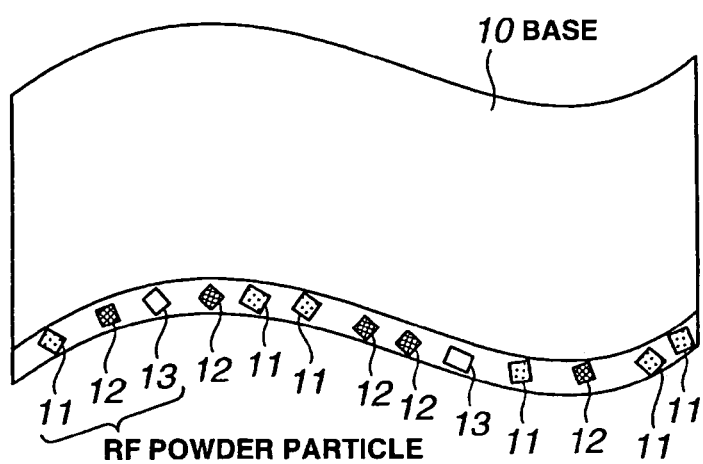
FIG. 1 is a sectional perspective view showing an embodiment of an RF powder-containing base according to the present invention.

FIG. 1 is a sectional perspective view showing an RF powder-containing base according to an embodiment of the present invention. FIG. 1 is an enlarged view showing that three kinds of RF powder particles 11, 12, and 13 are contained in a base 10 made of paper as an example. Herein, a bill is used as an example of the base 10. The RF powder particles 11, 12, and 13 have sensitivity to the electromagnetic waves with different frequencies, respectively. Although the RF powder particles 11, 12, and 13 are shown in FIG. 1 while slightly changing sizes thereof, it is shown to easily understand that the RF powder particles 11, 12, and 13 have sensitivity to the electromagnetic waves with different frequencies, respectively, and actually, the sizes of the RF powder particles 11, 12, and 13 are substantially the same.

Actually, each of the above-described RF powder particles 11, 12, and 13 is collectively treated in a use form of a powdery substance due to a large number of or a large quantity of RF powder particles, and configures the RF powder. Although the RF powder particles 11, 12, and 13 are shown as 13 pieces in total in FIG. 1, the number of RF powder particles is not limited thereto. If the use form of the RF powder of the powdery substance is taken into consideration, the RF powder particles 11, 12, and 13 dispersively spread over the base 10 with a sheet-like shape in practice. As described above, the base 10 which contains a large number of RF powders thereinside or a surface thereof will be referred to as "RF powder-containing base 10."

Additionally, the above-described "RF powder" means a powder, in which each of a large quantity of particles composing the powder (powdery substance) has an electrical circuit element for transmitting/receiving signals (information) with an external reader/writer device via radio waves (radio-frequency electromagnetic waves), and a normal use form is a collective form.

Figure 2:
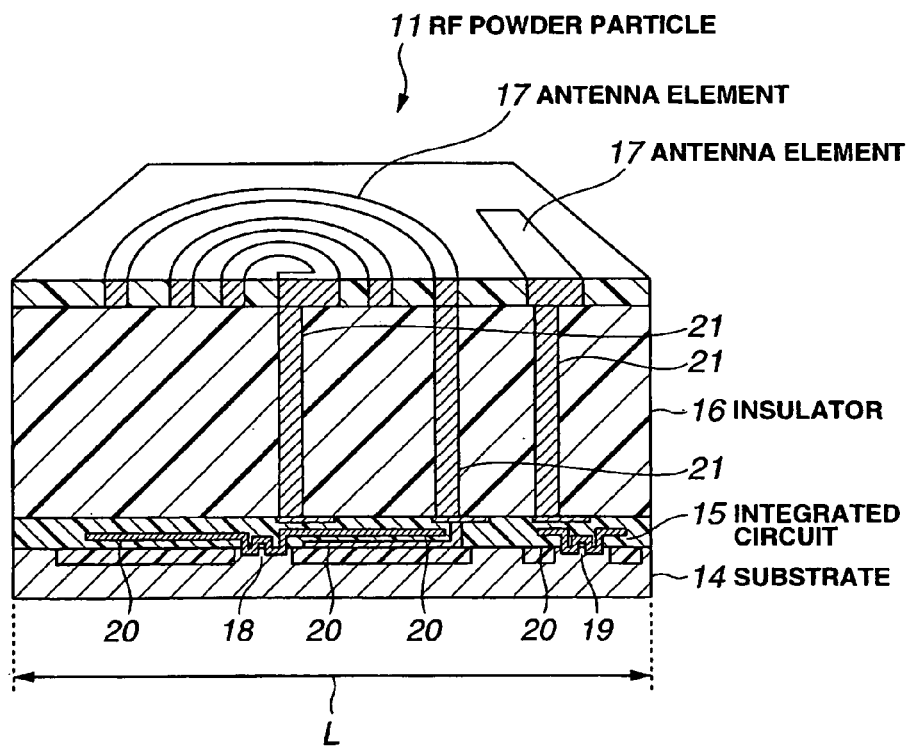
FIG. 2 is a three dimensional view showing a sectional main part of a single RF powder particle contained in the RF powder-containing base according to the present embodiment.

FIG. 2 is a sectional view showing a single RF powder particle (11). In FIG. 2, a thickness of the RF powder particle 11 is exaggeratedly shown. The RF powder particle 11 has a three-dimensional shape, in which with respect to a plurality of rectangular planes in outer front sides thereof, a size of the rectangular plane is not less than 0.05 millimeters square and not more than 0.30 millimeters square, and more preferably 0.15 millimeters square. In the RF powder particle 11 according to the present embodiment, a side L in the front shown in FIG. 2 is 0.15 millimeters (150 micrometers).

The RF powder particle 11 has an integrated circuit (IC) 15 provided with a memory function, such as FeRAM, formed on a substrate 14, such as silicon or the like, an insulating layer 16 with a thickness of approximately 30 micrometers formed on the integrated circuit 15, and an antenna element 17 responsive to an electromagnetic wave with a specific frequency (for example, 2.45 GHz) formed on the insulating layer 16. As an example of electrical circuit elements, transistors 18 and 19 which configure the integrated circuit 15, interconnections 20 connected to the transistors 18 and 19, and interconnections 21 for connecting the antenna element 17 and the integrated circuit 15 are shown in FIG. 2. The interconnections 21 are embedded in the insulator 16.

Figure 3:
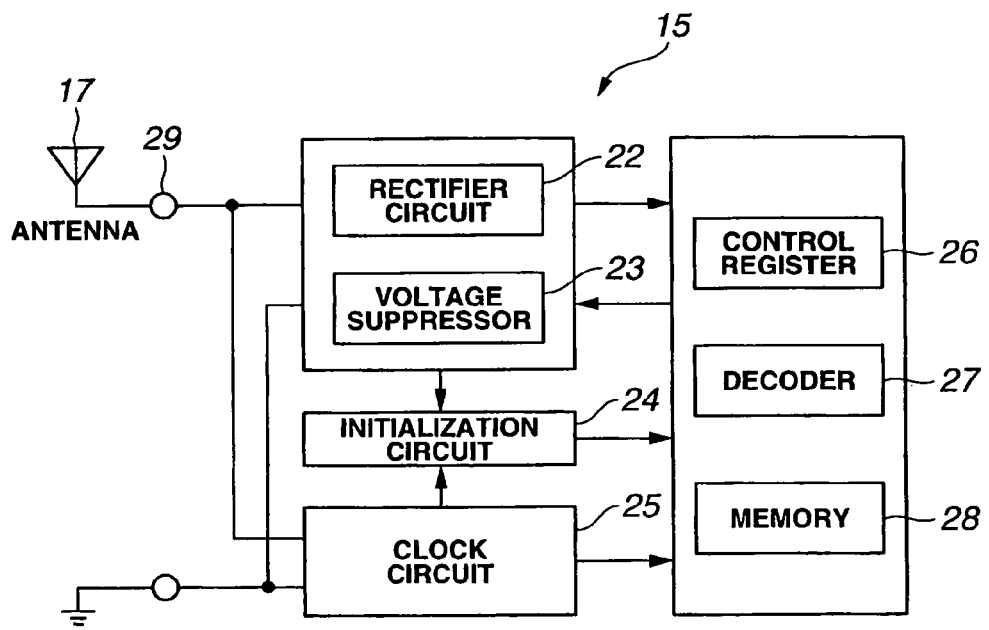
FIG. 3 is a block diagram showing a configuration example of an integrated circuit contained in the RF powder particle of the RF powder-containing base according to the present embodiment.

FIG. 3 shows one example of a circuit configuration of the integrated circuit 15 provided in the RF powder particle 11. The integrated circuit 15 is provided with a rectifier circuit 22, a voltage suppressor 23, an initialization circuit 24, a clock circuit 25, a control register 26, a decoder 27, and a memory 28, for example. These circuit elements have following functions, respectively.

The rectifier circuit 22 has a function for rectifying radio-frequency electromagnetic waves incoming from the outside into a DC power supply voltage. For example, the 2.45 GHz electromagnetic wave which is introduced via the antenna 17 and an antenna terminal 29 is converted into a voltage for operating internal analog circuits and digital circuits by the rectifier circuit 22. When the RF powder particles 11 approach a reader/writer 32 (refer to FIG. 5) and the rectifier circuit 22 generates the excessive voltage in response to excessive electromagnetic wave energy from the reader/writer 32, the voltage suppressor 23 suppresses the voltage and prevents semiconductor devices in the integrated circuit 15 from being damaged. The initialization circuit 24 controls start and end of the circuit operation and the clock circuit 25 demodulates a clock waveform. The memory 28 is, for example, an FeRAM in which identification numbers are stored. Contents in the memory 28 are selected by the control register 26 and the decoder 27 to be transmitted to the reader/writer 32.

While the RF powder particles 12 and 13 have substantially the same structures as that of the above-described RF powder particle 11, resonance circuit systems including the antenna elements 17 respectively owned by the RF powder particles 11, 12, and 13 are designed to have sensitivities to the electromagnetic waves with different frequencies. For example, the RF powder particle 11 is provided with the resonance circuit system which has sensitivity to the 2.45 GHz electromagnetic wave, the RF powder particle 12 is provided with the resonance circuit system which has sensitivity to a 2.0 GHz electromagnetic wave, and the RF powder particle 13 is provided with the resonance circuit system which has sensitivity to a 1.9 GHz electromagnetic wave.

Next, with reference to FIGS. 4 to 6, actual usages and actions of the RF powder-containing base (base 10) according to the embodiment of the present invention will be explained.

As illustrated in FIG. 1, the sheet-like base 10 such as a bill contains a considerable number of RF powder particles (11, 12, and 13). A thickness of the base 10 is exaggeratedly and enlargedly shown in FIG. 4. When it is made to be contained in the base 10, aqueous solutions (ink, paint, or the like) filled with an adhesive fixative containing the RF powder is made to soak into the base 10 with a dropper or the like. Thus, the RF powder is attached on a surface of the base 10 or is made to soak into the inside of the base 10. Alternatively, the RF powder may be mixed into the base 10 when manufacturing the base 10. For example, if the base 10 is paper, the RF powder is mixed thereinto when making paper.

The base 10 is scanned by the reader/writer 32 connected to a computer 31. The computer 31 reads information included in each of the plurality of RF powder particles via the reader/writer 32. The computer 31 is provided with a display 31a, a main unit 31b, a keyboard 31c, or the like.

The above-described reader/writer 32 has a read terminal 33 (refer to FIG. 6) and reads information provided from the RF powder particles 11 to 13 using radio-frequency electromagnetic waves (RF) in a specific frequency band including 2.45 GHz by the read terminal 33. The frequencies used in each of the plurality of RF powder particles are different from each other, and are, for example, 1.9 GHz, 2.0 GHz, and 2.45 GHz as described above. Hence, the reader/writer 32 is configured to read the electromagnetic waves of, for example, 1.5 to 3.0 GHz frequency band as the above-described specific frequency bands at proper timing. In order to read information from each of the plurality of RF powder particles 11 to 13 in the base 10 via the read in terminal 33, the reader/writer 32 performs a scanning operation in a certain direction along the surface of the base 10, and also changes the frequency used for transmission/reception within the specific frequency band.

Figure 5:
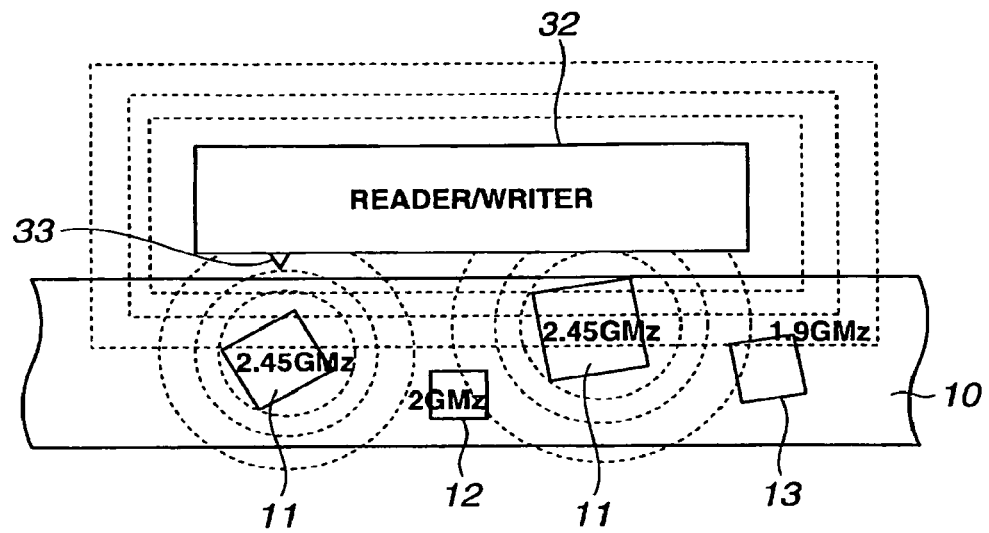
FIG. 5 is a schematic view showing a signal exchange between a reader/writer and the RF powder-containing base.

FIG. 5 schematically shows that a radio-frequency electromagnetic wave E with a specific frequency included in a predetermined frequency band is radiated from the read terminal 33 of the reader/writer 32. Specifically, it shows that when the frequency of the electromagnetic wave E radiated from the read terminal 33 of the reader/writer 32 is set to 2.45 GHz, the RF powder particle 11 is being responsive to the electromagnetic wave E. At this time, neither of the other RF powder particles 12 and 13 is responsive to the electromagnetic wave with a frequency of 2.45 GHz radiated from the read terminal 33. Here, since the wavelength of 2.45 GHz band is approximately 15 centimeters, the RF powder particles 11 to 13 are contained in a single wave, so that an electromagnetic field of the electromagnetic wave is combined with antennas to thereby cause energy transfer. It will be described in such a way that the radiated electromagnetic waves are transmitted and received seen from a distance.

Figure 6:
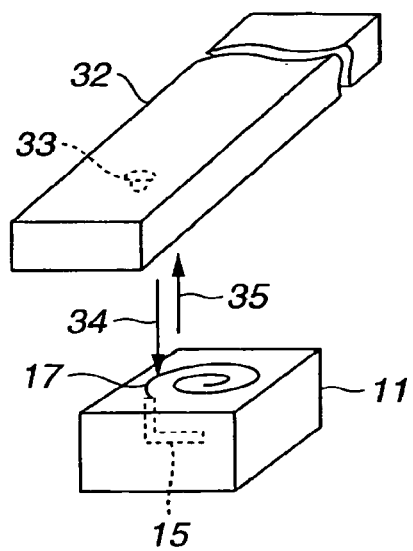
FIG. 6 is a detail view of a portion of FIG. 4 showing a transmission/reception relation of a radio-frequency electromagnetic wave with the reader/writer in an existence position of a single RF powder particle.

FIG. 6 shows a state where signals (information) are transmitted and received based on the radio-frequency electromagnetic wave (frequency of 2.45 GHz) given from the reader/writer 32 in an existence position of the RF powder particle 11. Assuming that the read terminal 33 provided in the bottom surface of the reader/writer 32 performs a scanning operation by scanning movements of the reader/writer 32 and is located above the RF powder particle 11. In this case, the read terminal 33 radiates the radio-frequency electromagnetic waves with several different frequencies, and when the electromagnetic wave of 2.45 GHz to which the RF powder particle 11 is responsive is radiated (an arrow 34 shown in FIG. 6), the RF powder particle 11 receives the radio-frequency electromagnetic wave, operates the integrated circuit 15 based on energy thereof, and extracts (or writes) information from the memory 28 to radiate it as the radio-frequency electromagnetic wave (an arrow 35 shown in FIG. 6) The electromagnetic wave radiated by the RF powder particle 11 is received by the read terminal 33 of the reader/writer 32. The read terminal 33 of the reader/writer 32 transmits the information received from the RF powder particle 11 to the computer 31, and the information provided from the RF powder particle 11 is memorized in the memory of the computer 31 in a position where there is the RF powder particle 11.

Similarly, in the case where the reader/writer 32 performs scanning movements, and the read terminal 33 thereof is located above the RF powder particle 12, when the electromagnetic wave radiated by the read terminal 33 reaches the frequency of 2.0 GHz to which the RF powder particle 12 is responsive, the RF powder particle 12 receives the radio-frequency electromagnetic wave, the integrated circuit 15 operates, and the information from the memory 28 is read (or written). Furthermore, similarly, in the case where the reader/writer 32 performs scanning movements, and the read terminal 33 thereof is located above the RF powder particle 13, when the electromagnetic wave radiated by the read terminal 33 reaches the frequency of 1.9 GHz to which the RF powder particle 13 is responsive, the RF powder particle 13 receives the radio-frequency electromagnetic wave, the integrated circuit 15 operates, and the information from the memory 28 is read (or written).

Figure 4:
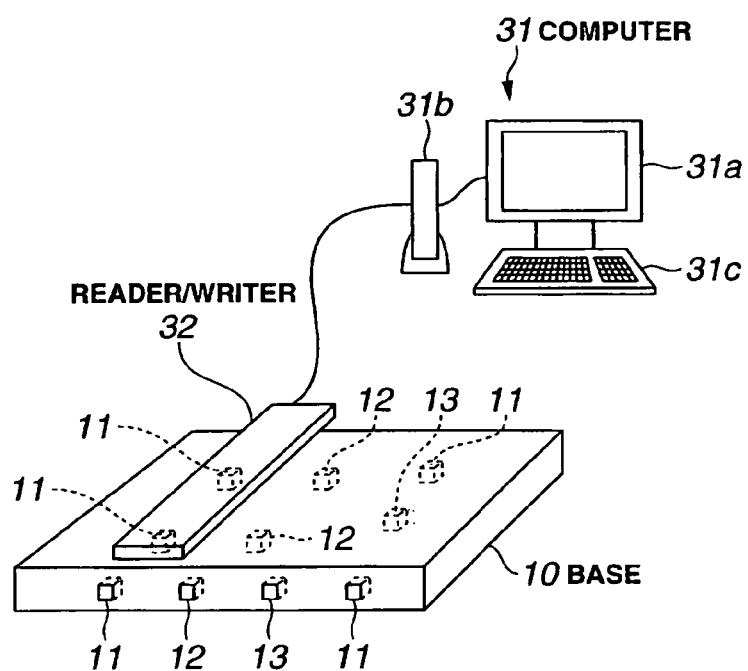
FIG. 4 is a device configuration view illustrating an actual usage and an action of the RF powder-containing base according to the present embodiment.

By the reader/writer 32 scanning over the whole inside and surface of the base 10 shown in FIG. 4, position information and frequency information of the RF powder particles 11 to 13 which exist throughout a scanning area in the base 10, and various kinds of information written in each of them are memorized in the memory of the computer 31. The information memorized in the memory of the computer 31 is displayed on the display 31a thereof if needed.

Producing bills by making the above-described RF powder particles 11 to 13 to be contained in the bills using the above-described method, or making the RF powders 11 to 13 to be contained in important documents such as official documents, licenses, insurance cards, the other important cards, or the like makes it possible to utilize the RF powder 11 for forgery discrimination of the bills, authentication of the important documents, or the like. Additionally, since the RE powder 11 is used as the powder (powdery substance) of collectively utilizing a plurality or a large number of RF powder particles instead of using it as an individual single IC tag chip in this case, the treatment is easy.

When the RF powder-containing base 10 is a bill, it is possible to discriminate whether or not the bill 10 is forgery based on the information displayed on the display 31a.

The RF powder-containing base 10 is produced in such a way that a large quantity of the RF powder particles 11, 12, and 13 separately manufactured in a predetermined RF powder manufacturing process are blended at a proper rate to produce an RF powder and the RF powder is made to be contained in the base 10. As a manner of making the RF powder particles to be contained in the base 10, for example, three kinds of adhesive containing aqueous solutions which respectively contain a required number of RF powder particles 11, 12, and 13 are written in the bills or the like with the dropper or the like. Thus, the RF powder particles 11, 12, and 13 are attached to and made to soak into a specific point.

In addition, the information memorized in the memory 28 of the integrated circuit 15 of the RF powder particles 11, 12, and 13 may be memorized before writing it in the bills or the like, or the information may be memorized by the reader/writer 32 into the RF powder particles 11, 12, and 13 contained in the bills after making the RF powder particles 11, 12, and 13 to be contained in the bills or the like to then produce the bills as the RF powder-containing base 10.

Note that while an example of the bills as the RF powder-containing base has been explained in the present embodiment, plastic cards such as paper for documents, business cards, credit cards may also be used other than that. For example, even for paper in which the RF powders are made to be contained to then be arranged and on which nothing is drawn, it is possible to create images on a display screen of the computer by reading the paper with the reader/writer, based on an arrangement of each RF powder particle, a frequency of the radio-frequency electromagnetic wave to which each RF powder particle is responsible, and information in the memory of each RF powder particle.

Meanwhile, although an example in which three kinds of RF powder particles 11, 12, and 13, but not limited to, are made to be contained in the base 10 has been explained in the present embodiment, the number of kinds of the RF powder made to be contained in the base may be not more than or not less than three.

Furthermore, although it has been explained in the present embodiment that a plurality kinds of RF powder particles are made to be intentionally contained in the base, the RF powder particles in which a distribution has occurred on a frequency to which the RF powder is responsible may be made to be incidentally contained in the base.

INDUSTRIAL APPLICABILITY

The RC powder containing base according to the present invention is utilized as bills, credit cards, documents, or the like whose forgery can be prevented.

The invention claimed is:

1. An RF powder-containing base which contains an RF powder, in which each particle of the RF powder includes:
    an integrated circuit formed on top of and in direct contact with a substrate;
    an insulating layer formed on top of and in direct contact with the integrated circuit such that the integrated circuit is positioned between the substrate and the insulating layer; and
    an antenna element formed on top of and in direct contact with the insulating layer;
    wherein respective particles of the RF powder which is contained in the base have sensitivity to any of electromagnetic waves with a plurality of different frequencies.

2. The RF powder-containing base according to claim 1, wherein the base is made of paper.

3. The RF powder-containing base according to claim 2, wherein the base is a bill.

4. The RF powder-containing base according to claim 1, wherein a size of a rectangular plane including the longest side in the particle is not less than 0.05 millimeters by 0.05 millimeters and not more than 0.30 millimeters by 0.30 millimeters.

5. The RF powder-containing base according to claim, 4, wherein the size of the rectangular plane including the longest side in the particle is 0.15 millimeters by 0.15 millimeters.

6. The RF powder-containing base according to claim 1, wherein the base is made of plastic.

7. The RF powder-containing base according to claim 1, wherein a length of one side of each particle is about 0.15 millimeters.

8. A base including a plurality of RF powder particles in which each RF powder particle comprises:
    a substrate;
    an integrated circuit formed on top of and in direct contact with the substrate;
    an insulating layer formed on top of and in direct contact with the integrated circuit;
    an antenna element formed on top of and in direct contact with the insulating layer; and
    a plurality of interconnections embedded in the insulating layer, the plurality of interconnections connecting the integrated circuit to the antenna element;
    wherein some of the RF powder particles are responsive to electromagnetic waves with a first frequency and other RF powder particles are responsive to electromagnetic waves with a second frequency different than the first frequency.

9. The base of claim 8, wherein the integrated circuit comprises ferroelectric random access memory ("FeRAM").

10. The base of claim 8, wherein the base has a sheet-like shape and the RF powder particles are dispersively spread over the base.

11. The base of claim 8, wherein the RF powder particles are attached to the base by soaking the base in an aqueous solution filled with an adhesive fixative containing the RF powder particles.

12. The base of claim 8, wherein the base comprises a bill, an official document, a license, or an insurance card.

13. The base of claim 8, wherein the base comprises a credit card or business card.

14. The base of claim 8, wherein a size of a rectangular plane including a longest side of the particle is not less than 0.05 millimeters by 0.05 millimeters and not more than 0.30 millimeters by 0.30 millimeters.

15. The base of claim 8, wherein an area of a substantially rectangular surface of each RF powder particle is not less than 0.0025 millimeters squared and not more than 0.09 millimeters squared.

16. The RF powder-containing base of claim 1, wherein an area of a rectangular plane including the longest side in the particle is not less than 0.0025 millimeters squared and not more than 0.09 millimeters squared.

* * * * *

UNITED STATES PATENT AND TRADEMARK OFFICE
CERTIFICATE OF CORRECTION

PATENT NO. : 8,154,456 B2  
APPLICATION NO. : 12/153662  
DATED : April 10, 2012  
INVENTOR(S) : Furumura Page 1 of 3

It is certified that error appears in the above-identified patent and that said Letters Patent is hereby corrected as shown below:

On the title page, item (56), under "OTHER PUBLICATIONS", in Column 2, Lines 1-2, delete "Dailey, Linda,................May 2007, p. 23.*".

On Page 2, item (56), under "OTHER PUBLICATIONS", in Column 1, Lines 3-5, delete "Usami, Mitsuo, An ......................2004 p. 2-5.*".

On Page 2, item (56), under "OTHER PUBLICATIONS", in Column 1, Line 14, delete "0.35-." and insert -- 0.35-μm. --, therefor.

On Page 2, item (56), under "OTHER PUBLICATIONS", in Column 1, Line 17, delete "PHotonics, pllytronic," and insert -- Photonics, polytronic, --, therefor.

On Page 2, item (56), under "OTHER PUBLICATIONS", in Column 2, Lines 1-2, delete "Hara, ...............................Feb.6, 2006.*".

In Fig. 2, Sheet 2 of 8, delete " 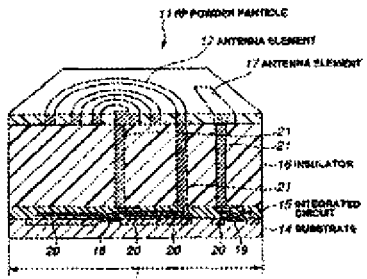 " and

Signed and Sealed this  
Third Day of July, 2012

David J. Kappos  
*Director of the United States Patent and Trademark Office*

CERTIFICATE OF CORRECTION (continued)
U.S. Pat. No. 8,154,456 B2

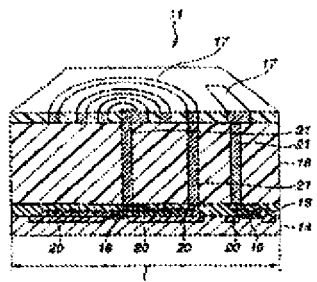

insert -- -- , therefor.

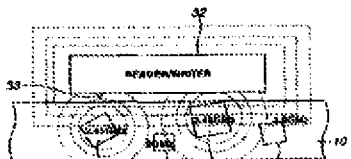

In Fig. 5, Sheet 5 of 5, delete " " and

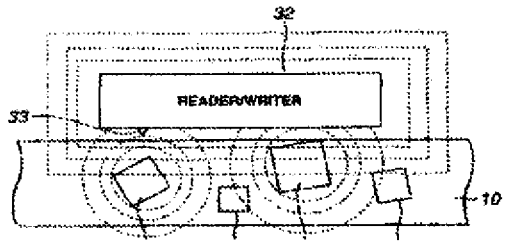

insert -- -- , therefor.

In Column 1, Line 46, delete "10-171951" and insert -- 10-171951. --, therefor.

In Column 1, Line 48, delete "Usani" and insert -- Usami --, therefor.

In Column 1, Line 49, delete "1183" and insert -- 1183. --, therefor.

In Column 3, Line 17, delete "15;" and insert -- 15: --, therefor.

In Column 3, Line 18, delete "16;" and insert -- 16: --, therefor.

In Column 5, Line 63, delete "FIG. 6)" and insert -- FIG. 6). --, therefor.

In Column 6, Line 36, delete "RE" and insert -- RF --, therefor.

In Column 7, Line 50, in Claim 5, delete "claim," and insert -- claim --, therefor.

In Column 8, Line 44, in Claim 15, delete "millimeters squared" and insert -- millimeters --, therefor.

In Column 8, Lines 44-45, in Claim 15, delete "millimeters squared." and insert -- millimeters. --, therefor.

In Column 8, Line 48, in Claim 16, delete "millimeters squared" and insert -- millimeters --, therefor.

In Column 8, Line 49, in Claim 16, delete "millimeters squared." and insert -- millimeters. --, therefor.